UNITED STATES PATENT OFFICE.

VICTOR RAISIN, OF PARIS, FRANCE, ASSIGNOR TO LA SOCIÉTÉ COMPAGNIE INDUSTRIELLE DES ALCOOLS DE L'ARDÈCHE, OF PARIS, FRANCE.

PROCESS OF RENDERING SAWDUST ABSORBENT.

998,858. Specification of Letters Patent. Patented July 25, 1911.

No Drawing. Application filed May 19, 1909. Serial No. 497,106.

*To all whom it may concern:*

Be it known that I, VICTOR RAISIN, a citizen of the Republic of France, and resident of Paris, France, have invented a new and useful Improvement in Processes of Rendering Sawdust Absorbent, which improvement is fully set forth in the following specification.

This invention relates to a process for the treatment of saw dust and similar materials, for the purpose of converting them into absorbent products which, on being mixed with viscous materials, render them easy to manipulate and suitable for receiving a chemical treatment. For example, a forage from molasses may be produced by mixing 25 parts of the absorbent product with 65 parts of molasses. This mixture will be immediately ready for use if the molasses contains, as is usually the case, 40 to 50 per cent. of sugar. Evidently in the place of the molasses it is possible to substitute the wash-waters of distilleries and obtain products from which certain elements might be extracted with suitable solvents.

This process consists—1. In submitting the saw dust or similar material to the action of surfuric acid, for instance, suitably diluted. 2. In eliminating the water contained in the mixture by evaporation, or in some other way. 3. In heating, and then 4. In stopping the action of the acid on the saw dust or similar material, which action takes place during the heating.

The process could be carried out for instance in the following manner when it is question of treating saw dust. The saw dust to be treated, is mixed with a certain quantity of acidulated water, the quantity of acid being about 2 to 4% of the weight of the saw dust to be treated. The mixture is heated in a closed vessel or in the open air to a temperature of 75–80° C. At first water contained in the mixture is evaporated without any perceptible chemical reaction. Then, when nearly the whole of the water has been evaporated, the acid at the above mentioned temperature energetically attacks the saw dust, and other acids are formed (namely acetic acid). On cooling the saw dust in order to stop the reaction, an absorbent product is obtained which can be mixed with viscous matters in order to render them easy to manipulate. Generally speaking, the mixture is cooled, that is to say, the reaction of the acid on wood interrupted on the mass assuming a brown color similar to that of roasted coffee, which color varies according to the kind of wood and of the materials treated. The product thus obtained, in addition to all the advantages of the ordinary absorbents, has also that of being cheap to manufacture.

Instead of stopping the reaction of the acid on the saw dust by cooling the mass, the reaction could be stopped by washing the product so as to eliminate the acid. It is then dried for use after, of course, the washing water has been removed.

By increasing the proportion of acid mixed with the water, the temperature and the time of the reaction could be reduced. The source of heat used can be any desired, and the heating can be carried out either in a closed vessel or in the open air. If the duration of the action of heat is increased, the temperature being maintained at between 75 and 80° C. the saw dust is converted into a charcoal of great density. The same result can be obtained at a lower temperature than 75–80° C. by increasing the proportion of the acid. By increasing the temperature of the treatment to, for instance, 90–100° C., and by keeping the same proportion of acid, a quicker conversion into charcoal is brought about.

Generally speaking, when the heating is continued for a long time or sufficiently great heat is used, without the temperature reaching that at which saw dust becomes converted into charcoal without the addition of any reagent, the saw dust is converted into charcoal.

Claim.

The process herein described of producing an absorbent of viscous materials, which consists in mixing a quantity of sawdust with 2 to 4% of its weight of sulfuric acid and approximately 20% of its weight of water, heating the mixture to a temperature of 75 to 80 degrees centigrade, continuing the application of heat at said temperature until nearly the whole of the water is evaporated, stopping the reactions within the mass, and drying the mass for use.

In testimony whereof I have signed this specification in the presence of two subscribing witnesses.

VICTOR RAISIN.

Witnesses:
 EMILE LEDRET,
 DEAN B. MASON.

Copies of this patent may be obtained for five cents each, by addressing the "Commissioner of Patents. Washington, D. C."